(12) United States Patent
Chen et al.

(10) Patent No.: US 7,436,665 B2
(45) Date of Patent: Oct. 14, 2008

(54) HEAT-DISSIPATING ASSEMBLY OF COMPUTER HOUSING

(75) Inventors: Chia-Sheng Chen, Taipei Hsien (TW);
Chih-Peng Laio, Taipei Hsien (TW)

(73) Assignee: Cooler Master Co., Ltd., Taipei Hsien (TW)

(*) Notice: Subject to any disclaimer, the term of this patent is extended or adjusted under 35 U.S.C. 154(b) by 0 days.

(21) Appl. No.: 11/768,281

(22) Filed: Jun. 26, 2007

(65) Prior Publication Data

US 2008/0019092 A1    Jan. 24, 2008

(30) Foreign Application Priority Data

Jul. 24, 2006    (TW) .............................. 95212986 U

(51) Int. Cl.
*H05K 7/20* (2006.01)
*H05K 5/00* (2006.01)

(52) U.S. Cl. ....................... 361/695; 361/687; 361/692; 361/694; 454/184

(58) Field of Classification Search ................. 361/687, 361/690, 694–695, 692; 174/15.1, 16.1; 454/184; 165/80.3
See application file for complete search history.

(56) References Cited

U.S. PATENT DOCUMENTS

| | | | | |
|---|---|---|---|---|
| 6,034,870 A * | 3/2000 | Osborn et al. | ............... | 361/690 |
| 6,297,950 B1 * | 10/2001 | Erwin | ........................ | 361/685 |
| 6,462,944 B1 * | 10/2002 | Lin | ............................. | 361/687 |
| 6,875,101 B1 * | 4/2005 | Chien | ......................... | 454/184 |
| 7,066,809 B2 * | 6/2006 | Yu et al. | ..................... | 454/184 |
| 7,106,586 B2 * | 6/2006 | Yu et al. | ..................... | 361/690 |
| 7,218,516 B2 * | 5/2007 | Yu et al. | ..................... | 361/695 |
| 7,244,178 B2 * | 7/2007 | Ueda et al. | .................. | 454/184 |
| 2004/0196631 A1 * | 10/2004 | Ueda et al. | .................. | 361/695 |
| 2006/0073782 A1 * | 4/2006 | Yu et al. | ..................... | 454/184 |

* cited by examiner

*Primary Examiner*—Jayprakash N Gandhi
*Assistant Examiner*—Robert J Hoffberg

(57) ABSTRACT

A heat-dissipating assembly of a computer housing with airways includes a casing. The casing is provided with a first partition and a second partition thereon. The first partition has a recessed space. The first partition is provided thereon with a plurality of penetrating troughs. The second partition is provided with a plurality of air-introducing ports thereon. The positions of the air-introducing ports and the positions of the penetrating troughs of the first partition are staggered respectively. Finally, the back and top of the casing are provided at least one fan respectively. Via this arrangement, after the external air enters the recessed space through the plurality of air-introducing ports, the external air is drawn into the casing by the fan on the first partition to perform an air-cooling effect and the heat dissipation. Finally, the air is drawn out of the casing by the fans provided on the top and back of the casing. Therefore, not only a good heat-dissipating effect can be achieved, but also the noise is reduced.

10 Claims, 5 Drawing Sheets

HEAT-DISSIPATING ASSEMBLY OF COMPUTER HOUSING

BACKGROUND OF THE INVENTION

1. Field of the Invention

The present invention relates to a heat-dissipating assembly, and in particular to a heat-dissipating assembly provided on a computer housing.

2. Description of Prior Art

With the continuous miniaturization of electronic products and the promotion of modem materials and advanced techniques, electronic elements generate a great amount of heat in operation. In order not to affect the operation of electronic elements as a result of the elevated-temperature environment caused by the heat source, the demand for the heat dissipation also increases continuously. Therefore, the heat-dissipating efficiency has become a very important factor in assuring the normal operation of the electronic elements.

Especially, since a computer host is formed by means of assembling various electronic elements (such as a main board, power supply, hard disk or the like) within a housing, and all of the above elements generate a great amount of heat in operation, the most common way in prior art is to mount a fan directly on the heat-generating electronic elements. The rotation of blades of the fan can cause the air surrounding the electronic elements to flow rapidly and take away the heat generated by the electronic elements, thereby achieving the heat dissipation of the electronic elements.

Although the fan can be considered as a simple device for dissipating the heat within the casing rapidly, in general, the heat-dissipating effect of the fan only reaches the surface that contacts the electric elements. Further, if several heat-dissipating fans operate simultaneously in a narrow computer casing, the heat may not be dissipated efficiently, increasing the temperature within the casing. Under the vicious circle of heat accumulation, the temperature within the casing cannot be kept in a normal range, affecting the operation of whole computer host.

In order to solve the increase in the temperature within the housing, a later-developed technique has attempted to provide the fans on the bottom and back of the casing respectively. By employing a principle that hot air can rise, the rotation of the fan provided on the bottom introduces the external cool air into the casing to perform a heat exchange. Further, the internal hot air is drawn to the outside via the fan provided on the back. In this way, the increase in the temperature within the casing can be abated.

The above solution can lower the temperature within the computer housing so as to control the temperature in a normal range and assure the operation of the computer host, however, since the efficiency of the fan provided on the bottom of the casing is affected by the position thereof, the efficiency of introducing air into the casing is not good and thus it is impossible to generate a great amount of air into the housing to perform an air-cooling effect and the heat dissipation. In addition, in operation, the fan provided on the bottom is used to draw the external air directly, which also generates unfavorable noise and causes the casing to vibrate. As a result, the electronic elements in the casing are not steady. Therefore, it is necessary to improve the conventional heat-dissipating structure.

SUMMARY OF THE INVENTION

In view of the above drawbacks, the present invention is to provide a heat-dissipating assembly of a computer housing with airways. By providing two layers of air-introducing means on the computer housing, and cooperating with the effect of a fan on the housing, the external air can be introduced into the housing rapidly to perform the heat dissipation. Also, the noise generated by the fan can be lowered.

The present invention provides a heat-dissipating assembly of a computer housing, which is mainly constituted of a casing. The casing is provided with a first partition and a second partition thereon. The first partition has a recessed space. The first partition is provided thereon with a plurality of penetrating troughs. The second partition is provided with a plurality of air-introducing ports thereon. The positions of the air-introducing ports and the positions of the penetrating troughs of the first partition are staggered respectively. Finally, the back and top of the casing are provided at least one fan respectively. Via this arrangement, after the external air enters the recessed space through the plurality of air-introducing ports, the external air is drawn into the casing by the fan on the first partition to perform an air-cooling effect and the heat dissipation. Finally, the air is drawn out of the casing by the fans provided on the top and back of the casing. Via this arrangement, not only a good heat-dissipating effect can be achieved, but also the noise is reduced.

DETAILED DESCRIPTION OF THE INVENTION

Figure 1:
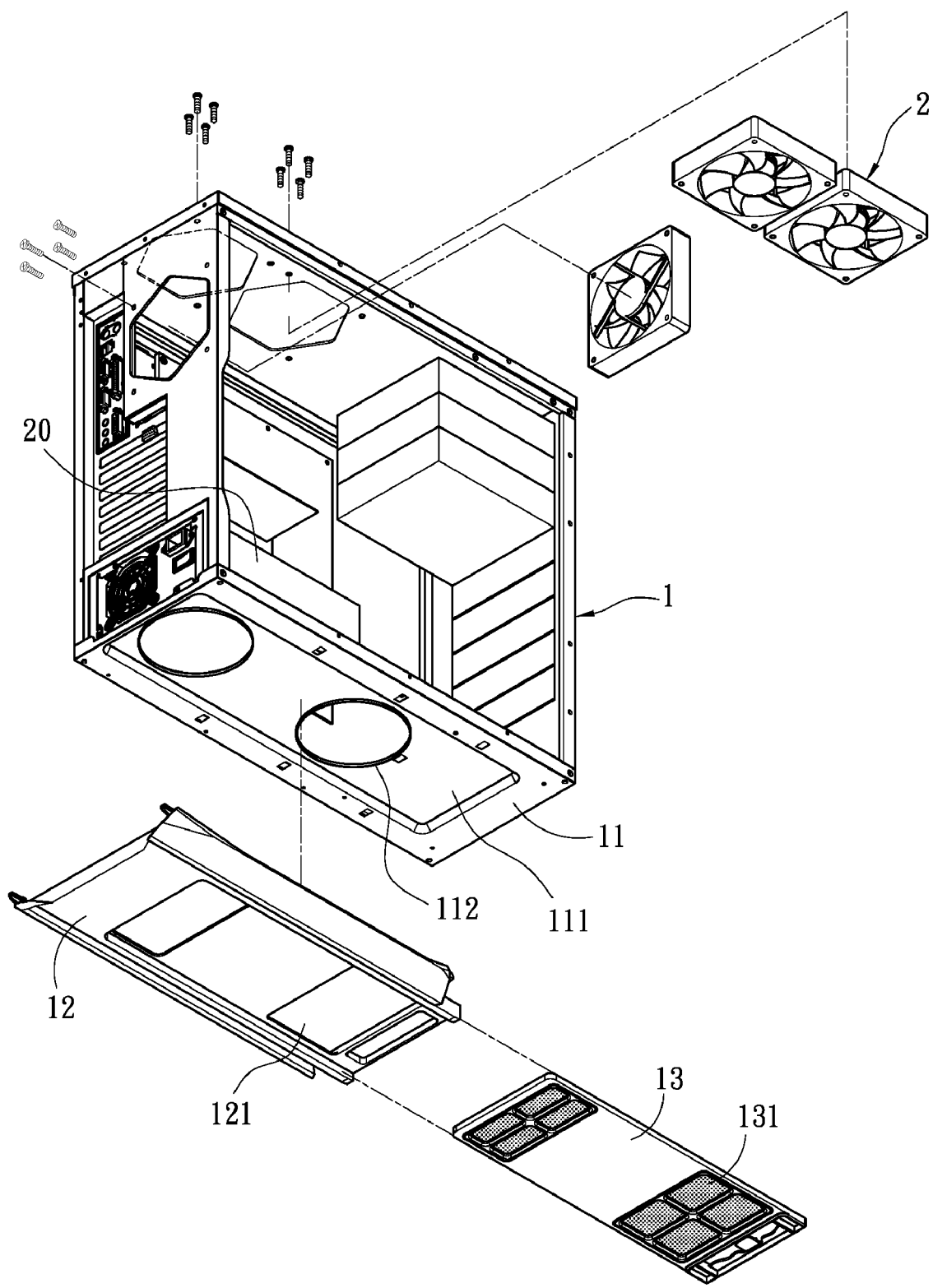
FIG. 1 is an exploded perspective view showing the structure of the present invention.
Figure 2:
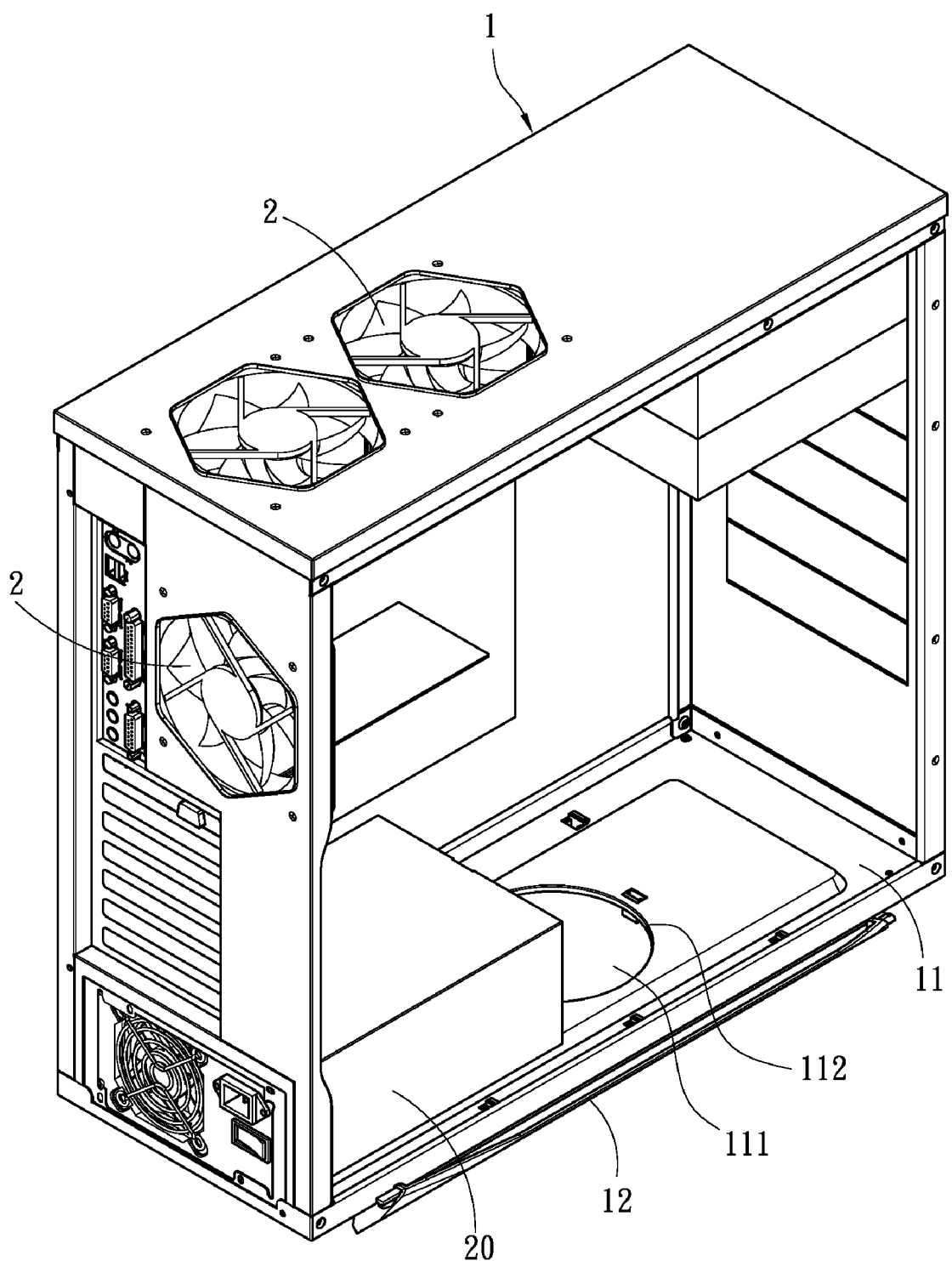
FIG. 2 is an assembled perspective view showing the structure of the present invention.

FIG. 1 and FIG. 2 are the exploded perspective view and the assembled perspective view showing the structure of the present invention respectively. As shown in these figures, the heat-dissipating assembly of the computer housing is mainly constituted of a casing 1. The bottom of the casing 1 has a first partition 11 and a second partition 12. The first partition 11 has a recessed space 111 that is recessed inwardly. The surface of the first partition 11 is provided with at least one penetrating trough 112 (two in the present embodiment). One of the penetrating troughs 112 is exactly provided below a power supply unit 20. The second partition 12 is provided below the first partition 11 and is connected with the bottom of the casing 1. The second partition 12 is provided with at least one air-introducing port 121 (two in the present embodiment). The positions of the air-introducing ports 121 and the positions of the penetrating troughs 112 of the first partition 11 are staggered respectively. Further, the second partition 12 is connected with a sliding plate 13 thereon. The sliding plate 13 is provided with at least one air filter 131 (two in the present embodiment). The positions of the air filters 131 correspond to the air-introducing ports 121 on the second partition 12 exactly, thereby blocking foreign matters from entering the casing 1. Further, the top surface of the casing 1 is provided with at least one fan 2 (two in the present embodiment). Further, the back surface of the casing 1 is provided with at least one fan 2. The complete assembly of the present invention is shown in FIG. 2.

Figure 3:
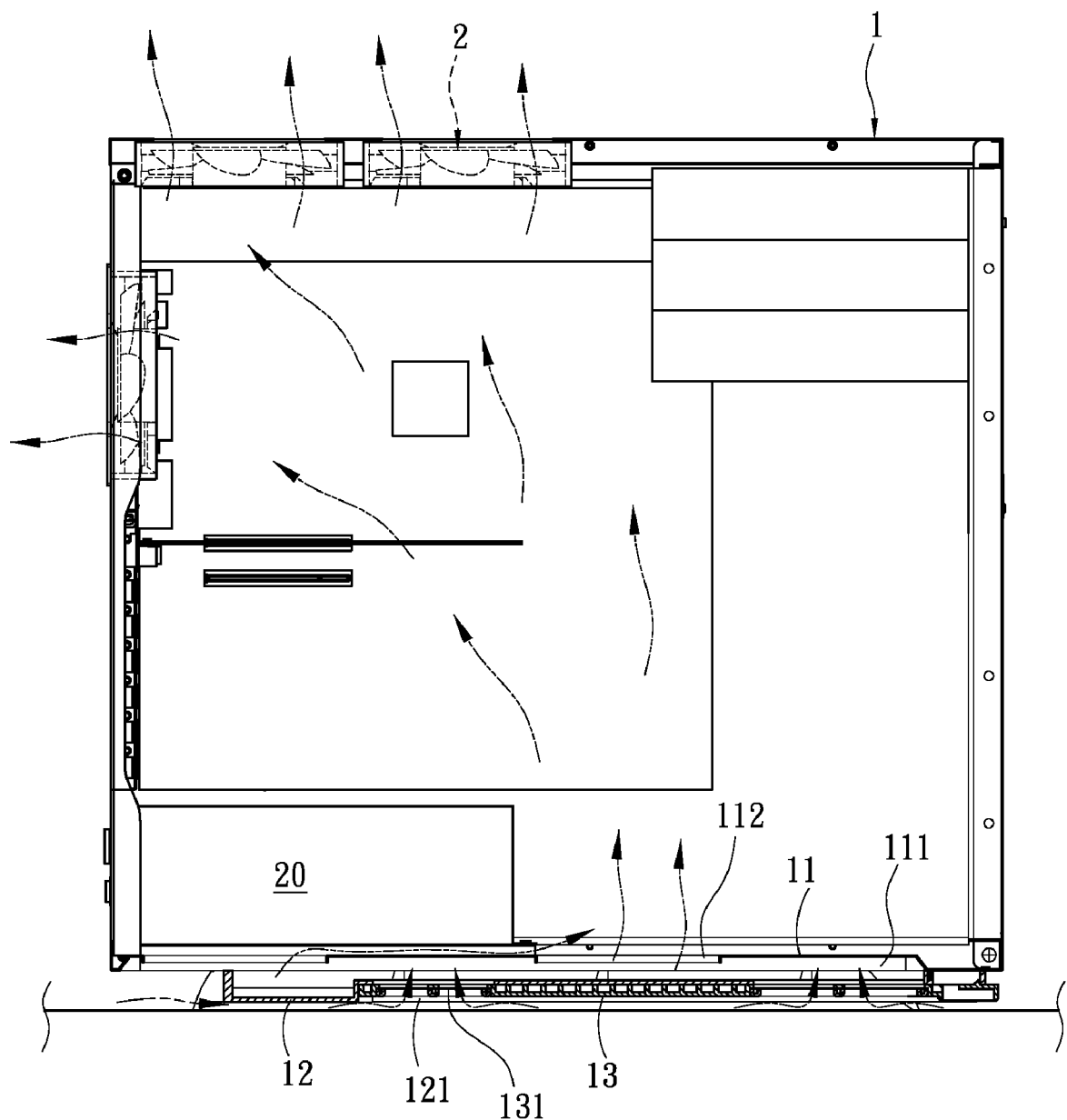
FIG. 3 is a cross-sectional view showing the operation of the present invention.

With reference to FIG. 3, it is a cross-sectional view showing the operation of the present invention. As shown in the figure, after the second partition 12 is assembled to the bottom of the casing 1, the casing 1 is supported upwardly so that the recessed space 111 of the first partition 11 forms a substantial airway between the first partition 11 and the second partition 12. When the external air enters through the air-introducing ports 121 of the second partition 12 (the direction of airflow is indicated by arrows), the air passes through the air filters 131 to enter the recessed space 111. Via the rotation of blades, the fans 2 provided on the top and back of the casing 1 force the air within the casing 1 to flow, and then causes the air in the recessed space 11 to flow into the casing 1 through the penetrating troughs 112 of the first partition 11 so as to heat-exchange with the heat generated by the electronic elements within the casing 1. Finally, the air that has absorbed the heat is exhausted to the outside of the casing 1 via the fans 2 provided on the top and back of the casing 1, thereby enhancing the heat dissipation in the casing 1.

Figure 4:
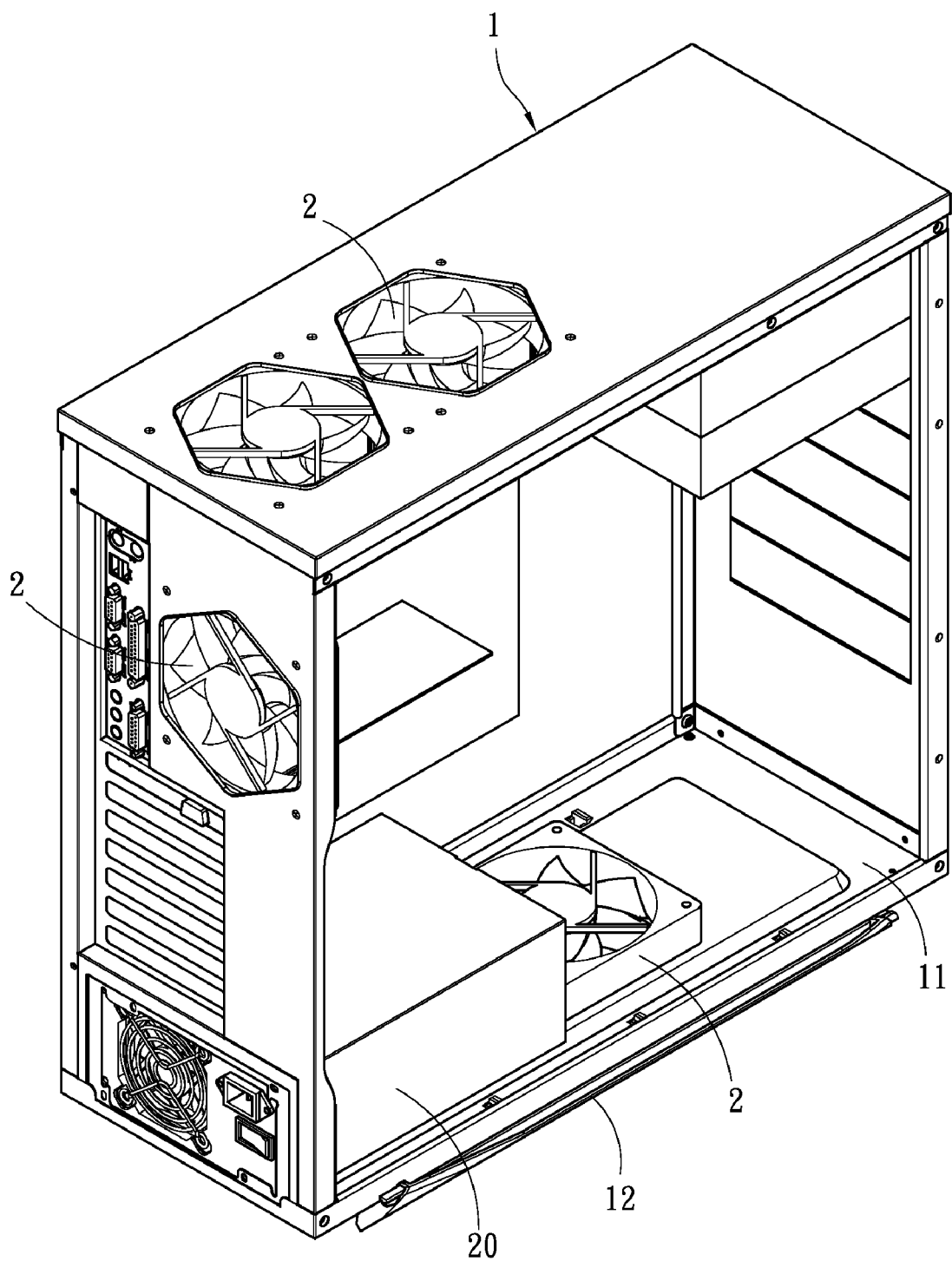
FIG. 4 is a schematic view showing the structure of another embodiment of the present invention.

With reference to FIG. 4, it shows another embodiment of the present invention. As shown in this figure, the penetrating troughs 112 provided on the first partition 11 of the casing 1 can be also provided with a fan 2 (one in this figure). With the fan 2 provided on the first partition 11, the air entering the recessed space 111 through the air-introducing ports 121 of the second partition 12 is forced by the fan 2 to flow. Then, the air enters the casing 1 to heat-exchange with the heat generated therein. Finally, the air that has absorbed the heat is drawn out of the casing 1 by the fans 2 provided on the top and back of the casing 1. With this arrangement, in order to provide an air-cooling effect and the heat dissipation for the interior of the whole computer casing 1, the recessed space 111 is designed to reduce the noise generated by the air colliding with the fans 2 of the penetrating troughs 12 during the drawing of air, thereby achieving a muting effect.

Figure 5:
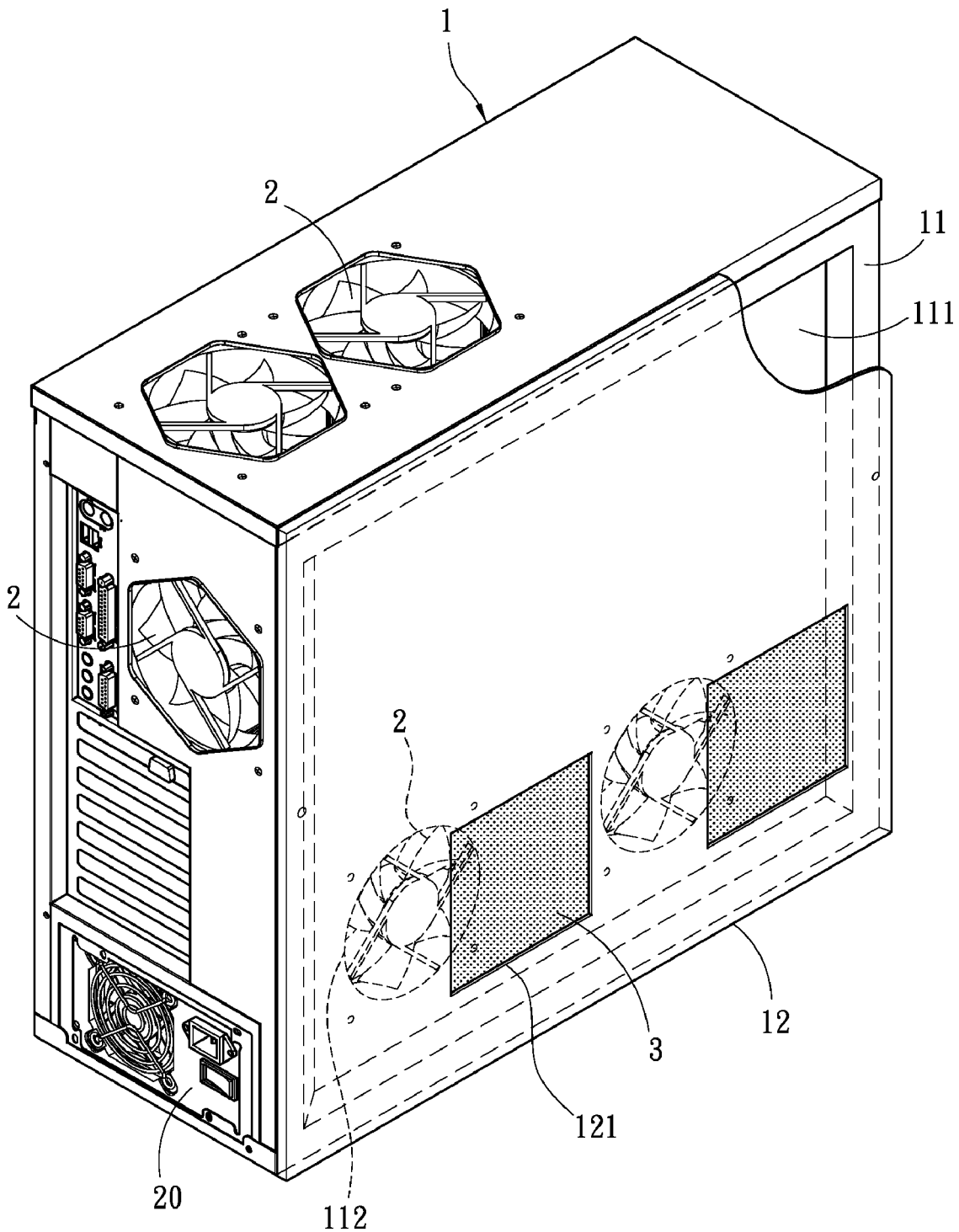
FIG. 5 is a schematic view showing the structure of a further embodiment of the present invention.

With reference to FIG. 5, it shows another embodiment of the present invention. The above-mentioned first partition 11 and the second partition 12 are provided on the bottom of the casing 1. Alternatively, in the present embodiment, the first partition 11 and the second partition 12 are provided on both sides of the casing 1. As shown in this figure, the first partition 11 has a recessed space 111. The first partition 11 is provided with at least one penetrating trough 112 (two in the present embodiment) at a position adjacent to the bottom thereof. Both penetrating troughs 112 are provided with a fan 2. The second partition 12 is provided at the outside of the first partition 11 and is connected with the casing 1. The second partition 12 is provided with at least one air-introducing port 121 (two in the present embodiment) at a position adjacent to the bottom thereof. The positions of the air-introducing ports 121 and the positions of the penetrating troughs 112 of the first partition 11 are staggered respectively. Further, the air-introducing port 121 is provided with an air filter 3 for blocking foreign matters from entering the casing 1. Finally, the top and back of the casing 1 are provided with at least one fan 2. In the present embodiment, the top of the casing 1 is provided with two fans 2, while the back thereof is provided with a fan 2. Via this arrangement, when the external air enters the recessed space 111 formed in the first partition 11 through the air-introducing ports 121 by means of natural convection, since the recessed space 111 forms a substantial airway, the fans 2 provided on the first partition 12 force the air to enter the casing 1 so as to perform the air-cooling action and heat-exchange with the electronic elements within the casing 1. Finally, the air that has absorbed the heat is exhausted to the outside of the casing 1 via the fans 2 provided on the top and back of the casing 1, thereby enhancing the efficiency of the heat dissipation in the casing 1.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A heat-dissipating assembly of a computer housing for dissipating heat generated by electronic elements, comprising:

a casing having a first partition and a second partition, the first partition being provided at inside of the second partition, the first partition having thereon a recessed space that is recessed inwardly, the first partition being provided thereon with a plurality of penetrating troughs, the second partition being provided thereon with a plurality of air introducing ports, and a surface of the casing being provided with at least one first fan, wherein first partition and the second partition are provided on a bottom of the casing, and wherein the penetrating troughs of the first partition and the air introducing ports of the second partition are staggered respectively.

2. The heat-dissipating assembly of a computer casing according to claim 1, wherein the second partition is provided thereon with a sliding plate, the sliding plate is provided with a plurality of air filters, and positions of the air filters correspond to the air-introducing ports exactly.

3. The heat-dissipating assembly of a computer casing according to claim 1, wherein each penetrating trough is provided with a second fan.

4. The heat-dissipating assembly of a computer casing according to claim 1, wherein the casing is provided thereon with a plurality of first fans that are located on top and back of the casing respectively.

5. A heat-dissipating assembly of a computer casing comprising:

casing having a first partition and a second partition, the first partition being provided at inside of the second partition, the first partition having thereon a recessed space that is recessed inwardly, the first partition being provided thereon with a plurality of penetrating troughs, the second partition being provided thereon with at least one air-introducing port, and a surface of the casing being provided with at least one first fan, wherein the first partition and the second partition are provided on a bottom of the casing, and wherein the casing is provided therein with a power supply unit, and a position of one of the penetrating troughs respectively corresponds to the bottom of the power supply unit exactly.

6. The heat-dissipating assembly of a computer casing according to claim 5, wherein each penetrating trough is provided with a second fan.

7. A heat-dissipating assembly of a computer casing comprising:

casing having a first partition and a second partition, the first partition being provided at inside of the second partition, the first partition having thereon a recessed space that is recessed inwardly, the first partition being provided thereon with a plurality of penetrating troughs, the second partition being provided thereon with a plurality of air-introducing ports, and a surface of the casing being provided with at least one first fan, wherein the first partition and the second partition are provided on one side of the casing, and wherein the penetrating troughs of the first partition and the air-introducing ports of the second partition are staggered respectively.

8. The heat-dissipating assembly of a computer casing according to claim 7, wherein the penetrating troughs of the first partition and the air-introducing ports of the second partition are provided on one side of the casing adjacent to a bottom thereof.

9. The heat-dissipating assembly of a computer casing according to claim 7, wherein each penetrating trough of the first partition is provided with a second fan.

10. The heat-dissipating assembly of a computer casing according to claim 7, wherein each air-introducing port of the second partition is provided with an air filter.

* * * * *

UNITED STATES PATENT AND TRADEMARK OFFICE
CERTIFICATE OF CORRECTION

PATENT NO. : 7,436,665 B2
APPLICATION NO. : 11/768281
DATED : October 14, 2008
INVENTOR(S) : Chia-Sheng Chen It is certified that error appears in the above-identified patent and that said Letters Patent is hereby corrected as shown below:

Title Page, Item (75)

(75) Inventors: Chia-Sheng Chen, Taipei Hsien (TW);
Chin-Peng Laio, Taipei Hsien (TW)

should be

(75) Inventors: Chia-Sheng Chen, Taipei Hsien (TW);
Chih-Peng Liao, Taipei Hsien (TW)

Signed and Sealed this
Twentieth Day of December, 2011

David J. Kappos
*Director of the United States Patent and Trademark Office*